(12) United States Patent
Kurtz

(10) Patent No.: US 7,180,401 B2
(45) Date of Patent: Feb. 20, 2007

(54) PERSONAL IDENTIFICATION APPARATUS USING MEASURED TACTILE PRESSURE

(75) Inventor: Anthony D. Kurtz, Ridgewood, NJ (US)

(73) Assignee: Kulite Semiconductor Products, Ic., Leonia, NJ (US)

( * ) Notice: Subject to any disclaimer, the term of this patent is extended or adjusted under 35 U.S.C. 154(b) by 126 days.

(21) Appl. No.: 11/004,058

(22) Filed: Dec. 3, 2004

(65) Prior Publication Data

US 2006/0132315 A1    Jun. 22, 2006

(51) Int. Cl.
*G06F 7/04* (2006.01)
(52) U.S. Cl. .................. 340/5.52; 340/5.53; 340/407.1
(58) Field of Classification Search ............. 340/407.1, 340/407.2, 5.8, 5.81, 5.82, 5.83, 5.52, 5.53, 340/5.54; 600/152, 587; 382/124, 126; 345/156
See application file for complete search history.

(56) References Cited

U.S. PATENT DOCUMENTS

| | | | | |
|---|---|---|---|---|
| 4,857,916 A | * | 8/1989 | Bellin | 340/5.52 |
| 5,920,642 A | * | 7/1999 | Merjanian | 382/126 |
| 6,003,381 A | * | 12/1999 | Kato | 73/721 |
| 6,028,950 A | * | 2/2000 | Merjanian | 382/126 |
| 6,297,838 B1 | * | 10/2001 | Chang et al. | 715/863 |
| 6,323,846 B1 | * | 11/2001 | Westerman et al. | 345/173 |
| 6,673,026 B2 | * | 1/2004 | Pozos et al. | 600/587 |
| 6,759,264 B2 | * | 7/2004 | Chou et al. | 438/48 |

* cited by examiner

*Primary Examiner*—Van T. Trieu
(74) *Attorney, Agent, or Firm*—Plevy, Howard & Darcy, PC

(57) ABSTRACT

A personal identification system employs a matrix of pressure sensors mounted to a plate having a template of a human hand. When a person's hand is placed on the plate and overlying the template a pressure profile of the person's hand is provided. This profile is compared with a stored pressure profile of the same person's hand. If the pressure points or profiles correlate a positive identification of the person is made.

15 Claims, 8 Drawing Sheets ent system according to the invention.
PERSONAL IDENTIFICATION APPARATUS USING MEASURED TACTILE PRESSURE

FIELD OF THE INVENTION

The invention in general relates to a personal identification apparatus, and more particularly, to an array of pressure sensors arranged within a replication matrix of a human hand for measuring exerted tactile pressure to enable identification.

BACKGROUND OF THE INVENTION

Personal identification systems presently afford a great number of significant uses. With the increase in security requirements, it is paramount to have both a simple and economical means of identifying a person. Prior art techniques for identifying an individual include fingerprint identification, the use of biometrics, including DNA sampling and other identification measures. Such measures are invasive techniques as biometrics require samples of a person's body fluid, hair, and the like. The identification of a person by DNA means is expensive and time consuming. Other less invasive techniques have also been proposed for identifying individuals, such as retina scans, for example. However, these techniques require expensive equipment in order to implement positive and secure identification. Accordingly, a personal identification apparatus which is economical, simple to utilize, and minimally invasive is highly desirable.

SUMMARY OF THE INVENTION

In accordance with an aspect of the present invention, a replication matrix of the human hand is provided on a matrix plate. The matrix contains a plurality of pressure sensors which are arranged throughout the hand matrix and which are operative to produce an output voltage proportional to an exerted pressure when a hand is placed on the plate. A person's hand pressure profile is determined during an enrollment procedure when the person positions his hand on the matrix plate. Afterwards the person's profile as applied to the plate is measured and compared against the stored enrollment values to determine whether or not the person is the person who he claims to be. The system and apparatus described provides a positive identification of an individual with minimal invasion.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and.

DETAILED DESCRIPTION

Figure 1:
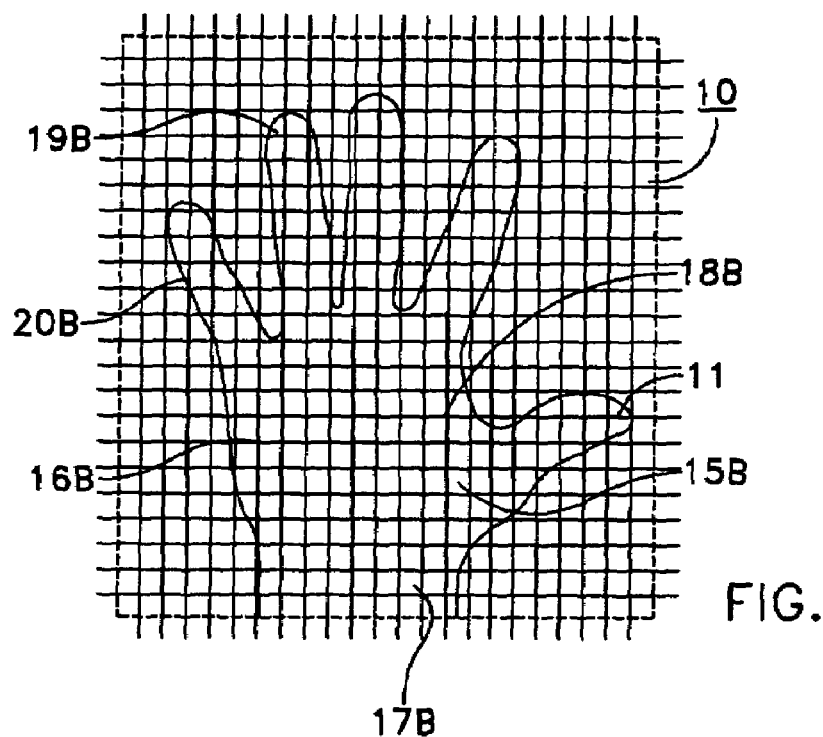
FIG. 1 is a top plan view of a replication matrix of the human hand for measuring an exerted tactile pressure according to the invention.

FIG. 1 illustrates a tactical pressure sensor plate or hand replication matrix 10. Essentially the sensor plate 10 includes a configuration of a hand 11. The configuration is a conventional human hand which hand replication or template will accommodate the smallest to the largest shaped hand. The replication matrix 10 is a universal template for the human hand. The template 11 will accommodate a wide range of varying hand sizes as is known. Such replications are familiar and have been utilized for measuring gloves, for example. Within the plate or hand replication matrix 11 there are positioned numerous pressure sensors. The pressure sensors are positioned and interconnected to provide a tactile pressure profile when a person's hand is emplaced upon the screen or matrix 11. In order to further the explain the operation of the present invention and the technical theory behind it, reference is made to FIG. 2.

Figure 2:
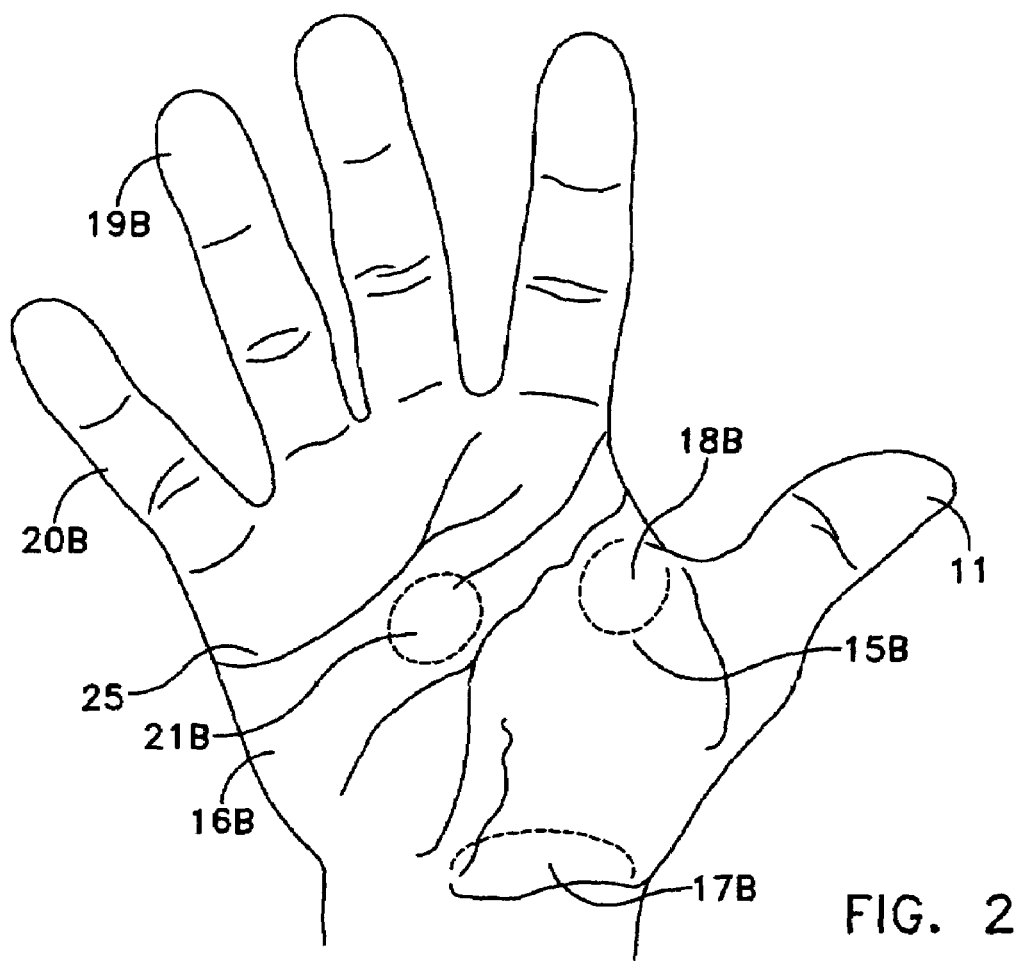
FIG. 2 is a top plan view of a representative human hand for further explaining the invention.
Figure 3:
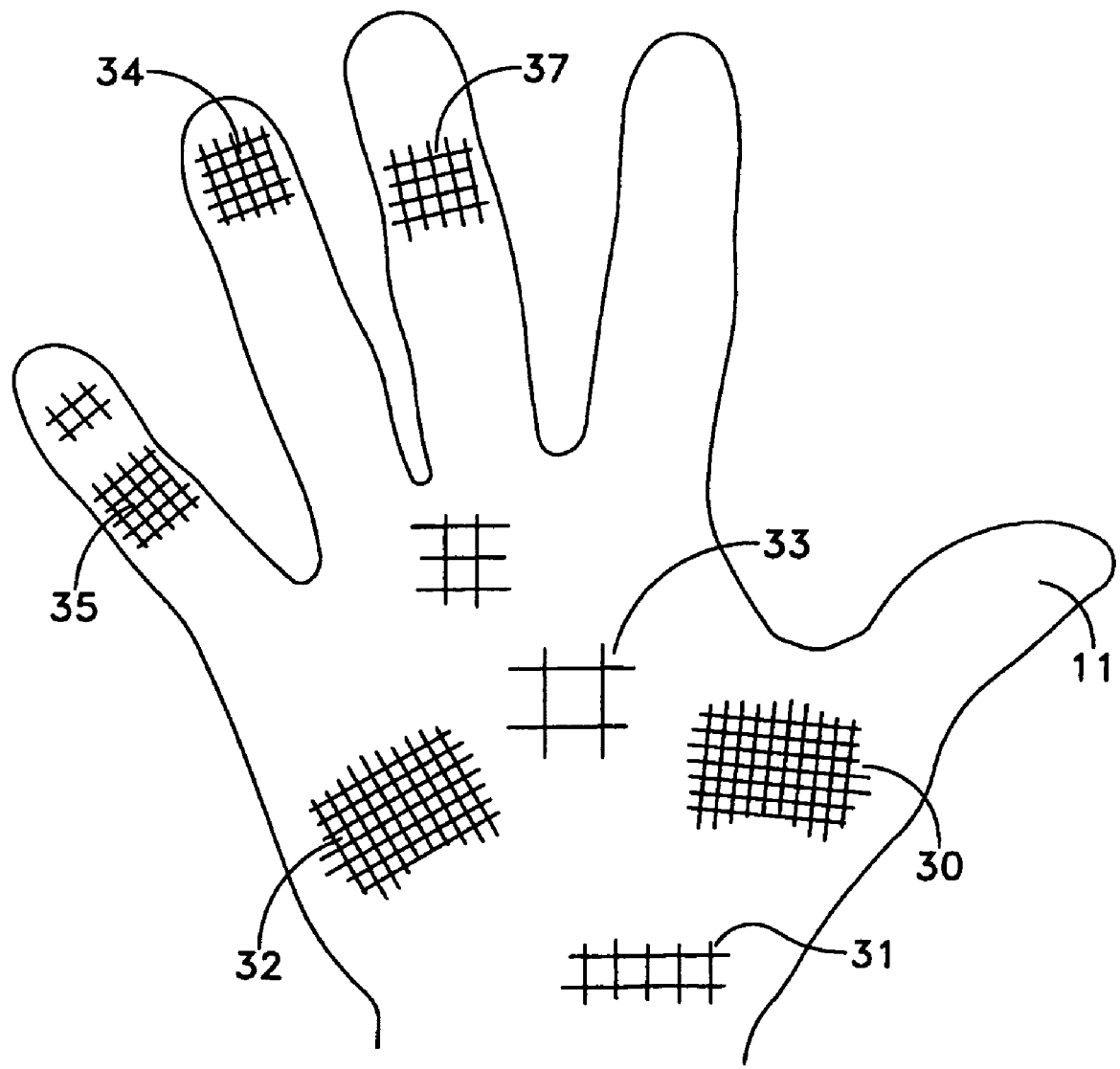
FIG. 3 is a top plan view of the human hand depicting arrays of pressure sensors located in various areas according to the invention.

FIG. 2 illustrates various areas of the hand which are designated by reference numerals. These reference numerals have been repeated in FIG. 1. In FIG. 2 there is shown the central area of a first digit commonly known as the "little finger" of a typical hand designated as 20B. In FIG. 2 the top area of the finger next to the first digit is designated by 19B. The area between the thumb and the first finger of the hand is designated as 18B, while another area near the thumb is designated as 15B, area 16B is shown which is associated with a portion of the palm while area 17B is also designated which is close to the person's wrist. The purpose of designating these areas is to illustrate that these areas, while substantially uniform from person to person, have very different characteristics in regard to surface contour, fatty content, length, and width, for example. There are muscles which are found in the hand. These muscles differ from person to person and are pronounced in certain areas of the hand as 15B. If a person is active, the area 15B would be more defined and would protrude a greater amount than for example, area 18B. While these characteristics are indicative of all people, the extent of the musculature of the hand as well as the extent of the depressions may vary greatly. It is known that the contours, as for example the map of the hand is quite different from person to person. Let us take the example of two people with identical hand configurations. This is meant that one assumes two people have the same exact size hand including same size fingers, thumb as well as width. Based on the fact that they are different individuals, they will nevertheless have different contours associated with the hand. For example, areas 20B, 15B, 18B, 19B will not extend in the Z axis as much for one person as for the other. Furthermore, there may be different depressions due to different muscle size and different variations of one person's hand as compared to another. Secondly, the contours, which are defined by the typical lines used by fortune tellers such as the line 25, are different. Due to many differences the pressure profile of two identical size hands will be different. Furthermore, the differences will exist no matter how much pressure is applied to the plate 10. As long as there is a minimum pressure applied by a person's hand, the pressure transducer assembly will be able to respond to this and determine that person's identity as compared to any other person's identity. This identification results in the differences between the contours of a person's hand, as well as the differences in the application of pressure applied by each unique hand configuration of each individual. Thus, when a different hand is placed on the sensor instrumented plate 10, a totally different pressure profile is obtained. The hand when placed on the plate will touch and depress the various sensors in the various areas as indicated for example as 15B, 17B, 18B and so on. While these areas have been depicted only by way of example it is understood from the configuration of FIG. 2 that there are pluralities of areas which are unique to each individual's hand. Furthermore, it is also understood that the number of pressure transducers which are implemented to provide the pressure matrix configuration of the hand can be varied according to common characteristics of the human hands. For example, most people have an extended area 17B which essentially is immediately above the wrist. Therefore, there does not have to be as many pressure sensors in this area as, for example, there would be in area 16B and 18B, where such areas could vary greatly depending upon the athletic activity and the strength of a person. Therefore in order to obtain accurate results, one may place more pressure transducers in the area 18B than in the area 17B. One may not place any pressure transducers in the central area depicted by dash circle 21B as most people have an extreme depression in this area, and this area would not normally contact the plate. Thus one can create a pressure map or pressure profile of a person's hand where the pressure map would have transducers emplaced thereon and located as a function of a hand structure. For example in areas where great differences are expected one could emplace a greater number of pressure transducers. This is shown in FIG. 3 whereby the number of transducers placed in each area can vary according to the general configuration of the average hand. While it is understood that this is one embodiment of the present invention, it is also understood that one could also emplace a plurality of pressure transducers at all locations indicative of the matrix replication of the hand 11 as shown and not be concerned with different areas. These hand areas can also be examined via a typical computer scan. The reason that one would want to control the placing of transducers according to a typical hand configuration is cost. Selective transducer placement could greatly reduce the number of transducers required to provide a pressure profile. The reduced number would still give an accurate measurement of hand pressure and user identification. It is of course understood that the entire hand matrix may be covered uniformly with transducers, as well as transducers could only be placed in designated areas as indicated above. The main objective is to be able to perform a uniform measurement of the tactile pressure profile exerted by each individual's hand.

In FIG. 3 there is shown a replica of the matrix 11 as depicted in FIG. 1. FIG. 3 shows various areas such as 30 where there is a matrix shown in X-Y format. Essentially at each X-Y intersection of the matrix 30 there is placed a pressure transducer. As indicated these pressure transducers are extremely small and are arranged in a matrix format. In area 30, the matrix includes many more pressure transducers than for example the number of pressure transducers in area 31. In a similar manner there are more pressure transducers in area 32 than there are in area 35 and 37. There are less transducers in area 35 than area 30 for example. As one can ascertain, a general format of pressure as well as contours exerted by an average hand is accommodated. It is noted that in areas where most people will contact the plate with relatively the same force will require less pressure transducers. Area 33 would require less transducers than for area 30. Area 33 is the central area of the hand where minimum contact with the plate is made. Area 30 which is located below the thumb is an area which will vary from individual to individual and therefore one would want a greater pressure profile resolution in this area. This will ascertain that the individual's profile is better accommodated to give a more accurate reading. While the above considerations should be apparent to those skilled in the art is also understood that the number of transducers throughout the hand profile can be the same. As for example one would employ a matrix of transducers as depicted by area 37 and the same matrix of transducers would exist throughout the entire hand profile. However, it is believed that placing transducers in greater concentrations in one or more areas of the hand which can vary greatly from individual to individual will provide a more reliable tactile pressure profile for each individual.

Operation of the system of the present invention may be described as follows: When a hand is emplaced upon the matrix 11 of FIG. 1 it now contacts a plurality of pressure transducers which essentially form an array. A user first contacts the pressure transducer array and is requested to apply pressure to the plate for a number of different times. The user is also asked to exert three or four different pressures on the plate. An area such as area 30 of FIG. 3 is monitored separately to determine a threshold pressure level. This area is monitored so that one may, for example, determine when a pressure A, B and C is applied to this area. This can be done by measuring the pressure which will be explained in FIG. 4. Thus a person in order to be identified must first enroll and have access to the system. Enrollment involves taking a pressure hand print or profile of the person during an enrollment mode. During this enrollment mode the person will be asked to place his hand on the matrix 11 and exert a first pressure which can be any arbitrary value. The value may be implemented by merely placing the person's hand on the plate without exerting any force. The person may be asked to push a little harder during the second mode B and for example be asked to push even harder during the third mode C. Of course the activation of the modes would be automatically monitored by monitoring an area or multiple areas such as 30, 32 and 37 in order to obtain an overall pressure profile of the person. The area may be monitored according to an applied pressure as 5, 10, 15 psi, for example. These profiles will be stored in a computer in a conventional manner. The matrix can be utilized to produce an instantaneous pressure profile of a person's hand by monitoring all points in a single manner. Alternatively one can monitor each of the pressure transducers by scanning the pressure matrix as will further be explained.

Figure 4:
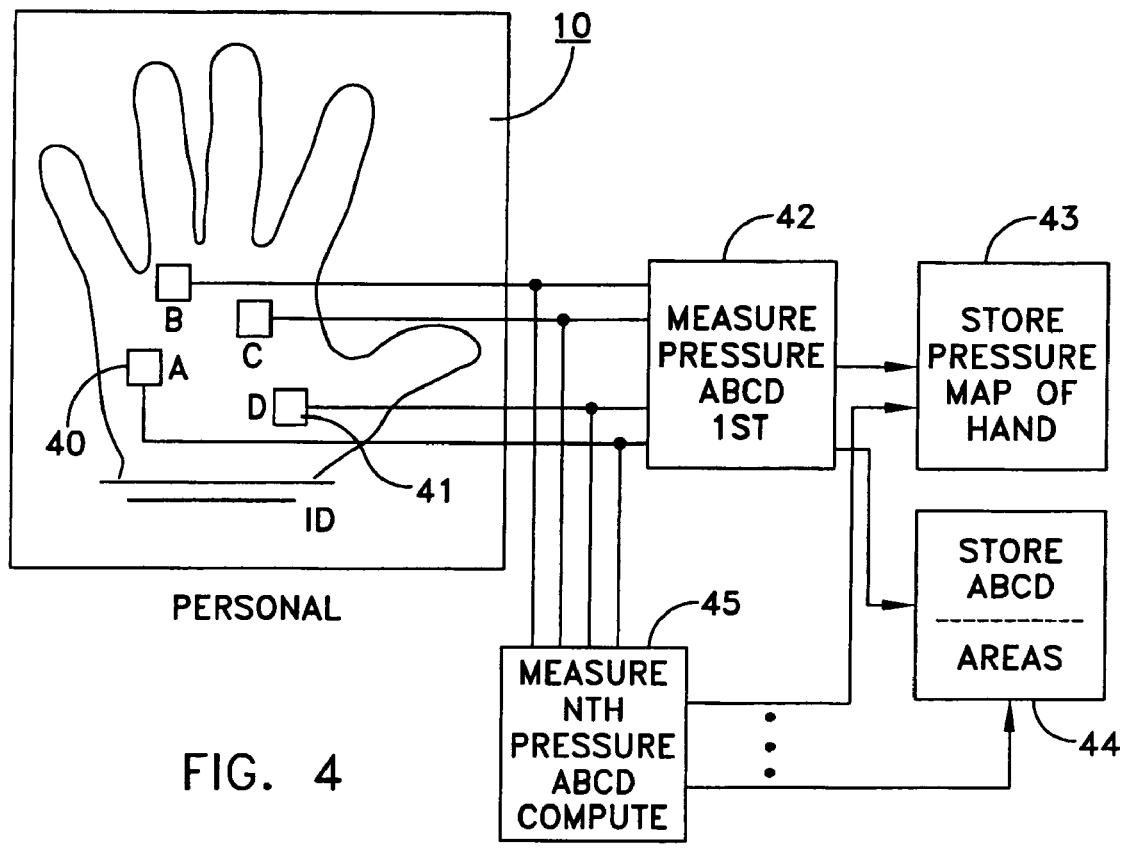
FIG. 4 is a diagrammatic view of an enrollment procedure according to the invention.

FIG. 4 shows an enrollment scheme. As indicated each person must have a pressure profile implemented and stored in order for him to be recognized. Hence as shown in FIG. 4 a person is associated with an ID or an identification number which may be a PIN in case of business security or may be a social security number. Thus the system can be utilized to gain access to airports and other public places for security checks. It is understood that the personal ID number may be a number associated with a corporation so that a person may gain entry to secure premises or given areas by the use of his hand pressure identification profile. As one will understand in order to have the ability to identify people one must first enroll the person in the system. Shown in FIG. 4 a person to be enrolled now places his hand on the tactile measuring matrix 10. In this manner the pressure of the hand is measured as indicated by module 42. Pressure measurements are extremely conventional. The matrix 11 which is on the screen may have pressure transducers located throughout the hand configuration or the number of pressure transducers may be different in various areas. In order for an enrollment to take place one places his hand on the hand matrix and for a normal positioning of the hand pressures will be induced throughout the template area. Certain areas such as 40, 41 or other areas designed by A, B, C and D may also be separately monitored for each individual. These areas can be the areas that are particularly different for each individual. In any event the entire profile of the pressure exerted by a person's hand is obtained and stored as a pressure map or profile as indicated in module 43. This pressure profile can be stored in a memory in digital form or can be stored by any other techniques such as optical storage. During the enrollment the person may be asked to exert a second pressure during a second time. During the second pressure measurement the entire hand profile is again taken and stored as well as particular areas A, B, C, D if desired. More than two pressure measurements can be taken as indicated by module 45 and therefore the hand pressure profile of this person can be stored for different pressure measurements. By using conventional algorithms the pressure profile of a person's hand can now be correlated based on the multiple pressures utilized by the system. One obtains a generic pressure profile which, for example, shows that the person in question exerts a certain pressure in area A as compared to area B as compared to C as compared to D. Essentially what is indicated is that the pressures applied in areas A, B, C and D will be relatively proportional to each other in the same ratio and relatively independent of the pressure applied. For example, at rest based on the formation of a person's hand or otherwise, the pressure ratio exerted between areas A and B will be a given constant. As one applies greater pressure the ratio between A and B will remain relatively the same as well as the ratios between A, B, C and D. In this manner one does not really have to take a full profile of the person's hand but may take different profiles in regard to different areas as indicated. All these pressure profiles are stored in a computer and are associated with the personal identification number of the person to be identified.

Figure 5:
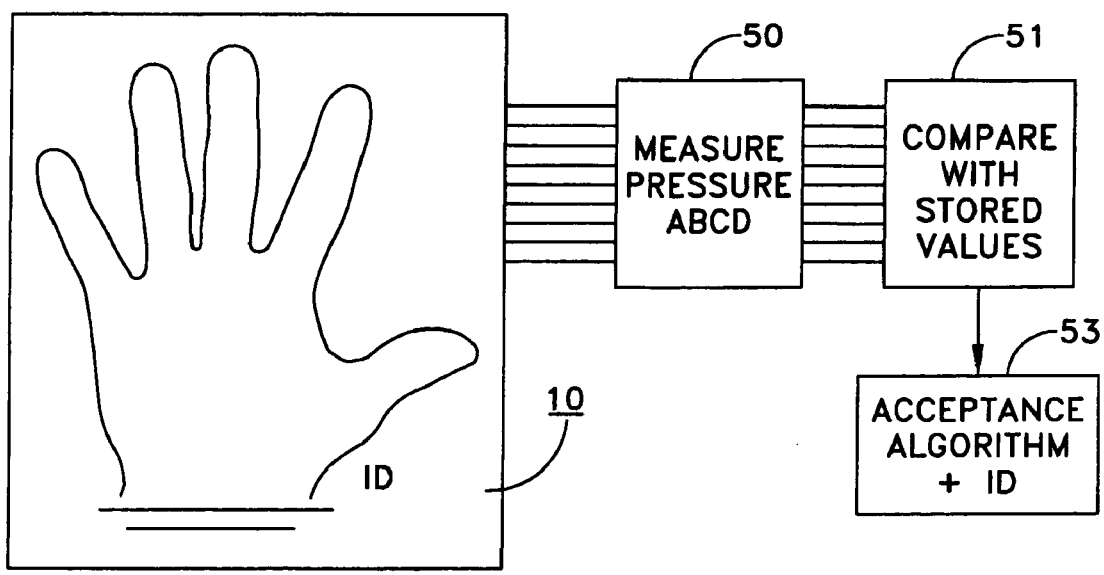
FIG. 5 is a diagrammatic view of a comparison measurement system according to the invention.

The identification process is shown in FIG. 5. Again the person places his hand on the replication matrix 10 and the pressure exerted is measured as indicated by module 50. As seen the areas A, B, C and D can be looked at and stored for this person or the entire hand pressure profile of the person can then be measured. The pressure profile as obtained from the person is now compared with stored values indicative of the person's enrollment procedures as shown in FIG. 4. One can use conventional and well known algorithms to determine whether or not the comparison of the stored vales with the actual measured pressure values correlate as indicated by module 53. This is a typical acceptance algorithm which will confirm that the pressure points exerted by this person are indicative of the pressure points stored during the enrollment procedure of the person. Essentially such algorithms are well known, and are utilized in speech processing and other systems to correlate data with previously stored data. Thus the system will accept this person and provide legitimate identification based on the pressure profile exerted by this person's hand as compared to the pressure profile which was previously stored.

Figure 6:
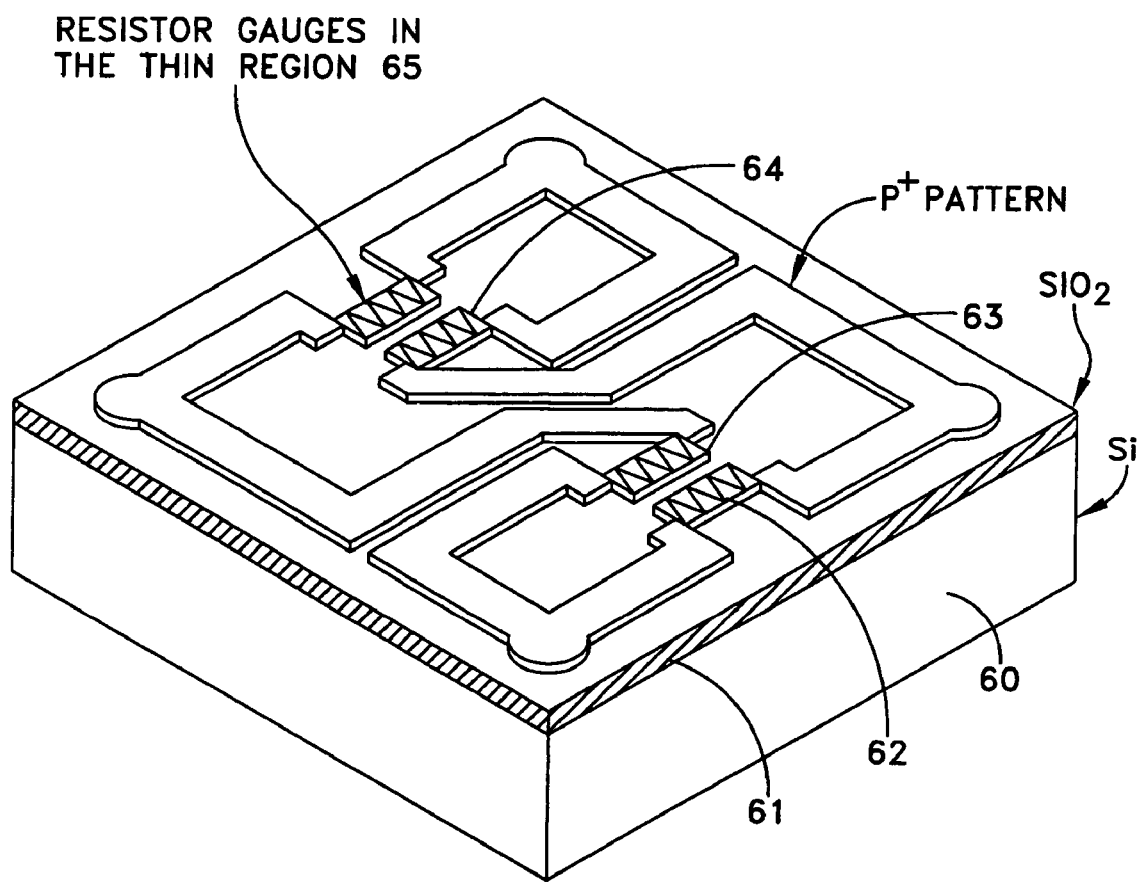
FIG. 6 is a plan view of a pressure sensor employed in the invention.

In FIG. 6 there is shown a typical pressure transducer in a plan view. Essentially the pressure transducer has a wafer 60 of silicon which is well known. There is a layer 61 of silicon dioxide on the wafer on which piezoresistors 62, 63 are deposited by conventional techniques. The resistors are positioned on the diaphragm region of the sensor and basically piezoresistors vary resistance according to applied pressure. The resistor 62 and the remaining resistors as 63, 64 and 65 are connected by the P+ pattern conducting areas in a Wheatstone bridge configuration. Such pressure transducers are well know and many examples of such transducers exist and are manufactured by the Kulite Semiconductor Products, Inc., the assignee herein. See for example U.S. Pat. No. 6,577,224 entitled Ultrahigh Pressure Transducer, see also U.S. Pat. No. 6,642,594 entitled Single Chip Multiple Range Pressure Transducer. Both patents name Anthony D. Kurtz, the inventor and both have been assigned to Kulite Semiconductor Products, Inc., the assignee herein. As one can ascertain there are many other Kulite patents which are pertinent to pressure transducers and which have been assigned to the assignee herein.

Figure 7:
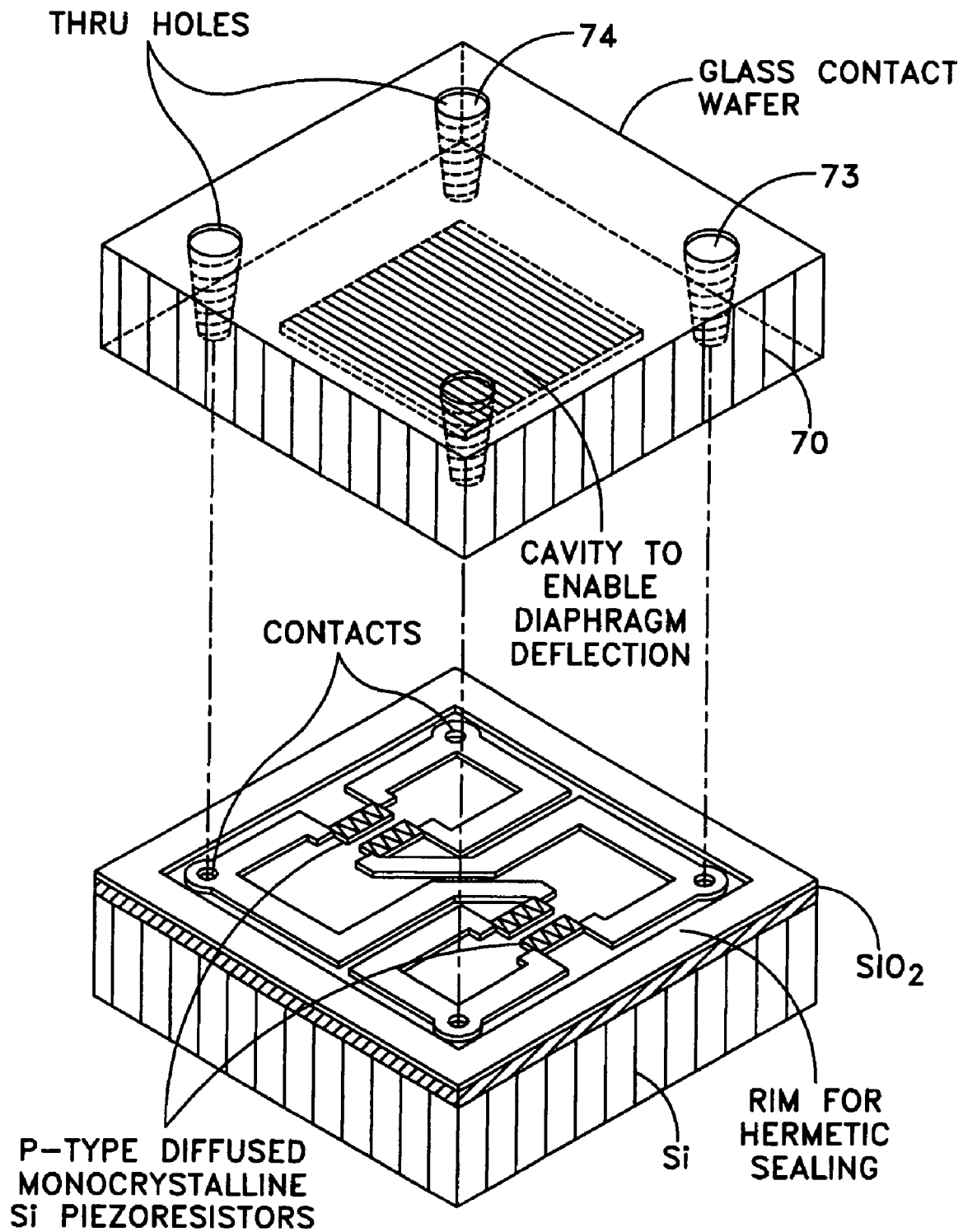
FIG. 7 is a plan view of the pressure sensor of FIG. 6 together with an interconnecting glass wafer layer.

In FIG. 7 there is shown the transducer of FIG. 6 together with a glass cover member or wafer 70. The glass wafer 70 has apertures therein which are filled with a conductive material 73 to provide contacts for the Wheatstone bridge. Thus contacts 73 and 74 enable one to obtain output voltages from the bridge which are directly proportional to applied pressure.

Figure 8:
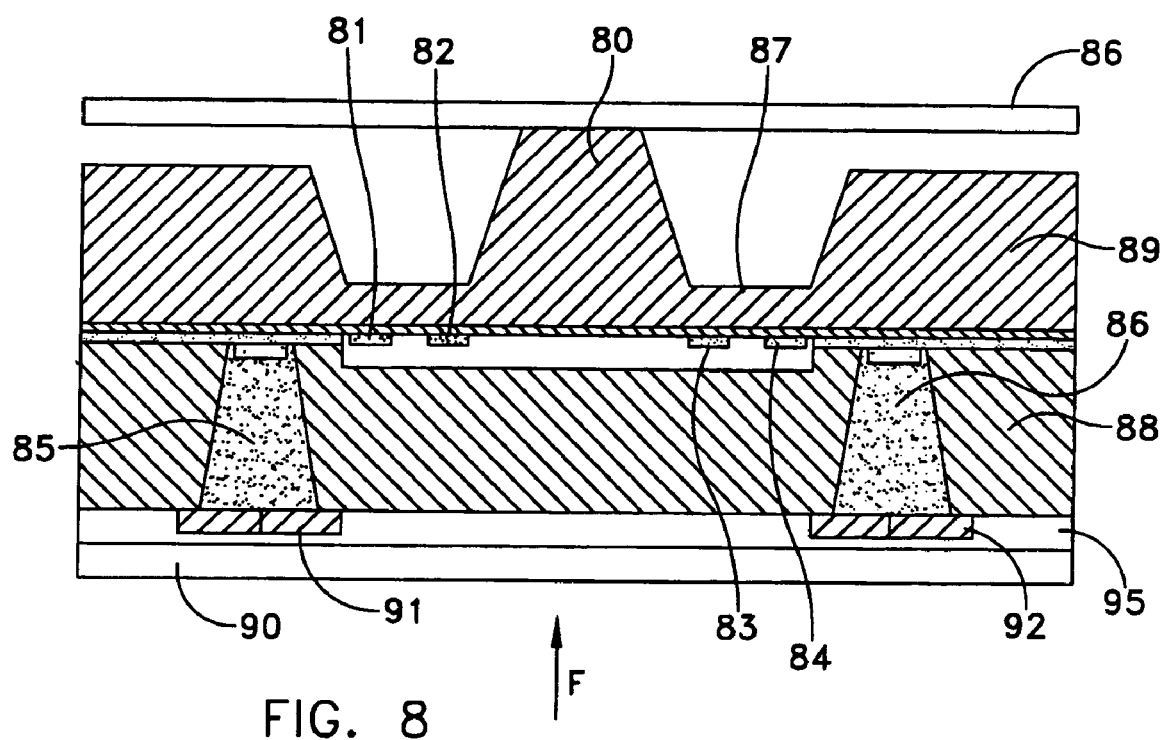
FIG. 8 is a cross sectional view of a typical sensor utilized in this invention and positioned between two plates according to the invention.
Figure 9:
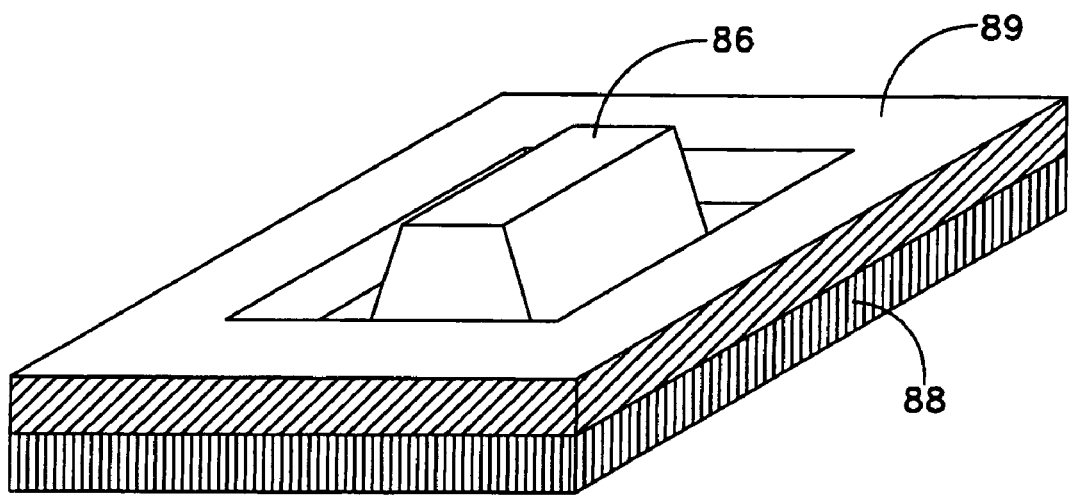
FIG. 9 is a perspective view of the sensor utilized in the invention.
Figure 10:
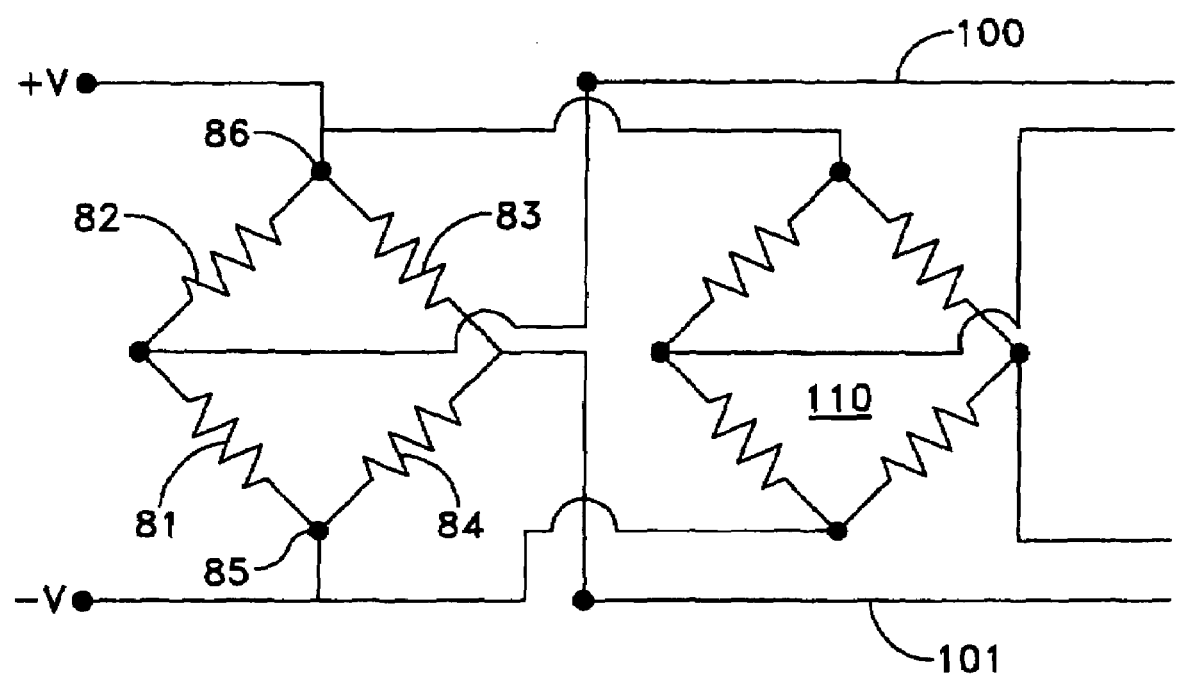
FIG. 10 is an electrical schematic showing two sensors wired to produce output, according to the invention.

In FIG. 8 there is shown a cross sectional view of the semiconductor, pressure sensor depicted in FIG. 7. The semiconductor sensor has a central boss 80 which boss extends beyond the top surface of the silicon wafer layer 89. The piezoresistors as 81, 82, 83 and 84 are arranged in a Wheatstone bridge configuration as is well known. The bridge has contact areas which are depicted by reference numerals 85 and 86. There is shown a thin interconnecting layer 95 which layer 95 contacts areas 91 and 92 to provide direct contact to the terminals of the piezoresistive bridge. In this manner the bridge can be biased and the output voltage can also be obtained. FIG. 10 shows a relatively simple diagrammatic sketch wherein piezoresistors 81 and 82 are shown in FIG. 10 together with resistors 83 and 84 wired into Wheatstone bridge connection. The terminals for 85 and 86 receive bias voltage while the output terminals are directed to output leads 100 and 101. In a similar manner the next pressure transducer designated by numeral 110 again receives bias voltage and has output leads. Thus the layer 95 is a connection sheet which serves to provide bias connections and output leads for the entire pressure transducer array. The layer 95 is covered by a thin plastic layer 90 which has the imprint of the hand formed thereon. As seen all the bosses are again coupled or otherwise secured to a ground plate 86 which basically is a stationary plate which may be constructed from a rigid material. A pressure exerted upon the pressure sensor in the direction in arrow F depicted in FIG. 8 will cause a deflection of the transducer to enable an output voltage to be obtained. While the deflection plate is shown as plate 86 and the interconnecting plate is shown as plate 92 it is also understood that there are other ways of positioning the sensors between two plates. It is of course understood that the imprint of the hand can be impressed on plate 86 and therefore when a person places his hand on the plate it would touch and depress the bosses 80 of the various sensors giving rise to an output which is representative of all the sensors contacted. It is also understood that one can also have an imprint of the hand on plate 90 which again will cause the diaphragms to deflect. In a similar manner the sensors can be arranged in a matrix which can be formulated by integrated circuit techniques on a single semiconductor chip taking the shape of various parts of the hand. It will thus become apparent to one skilled in the art that there are many ways for implementing the present invention. Essentially the present invention discloses a method for measuring tactical pressure when hand is placed on an instrumented plate. The plate consist of a metal or plastic surface which is covered with a thin interconnecting layer. A large group of very small pressure sensors are mounted to the interconnection layer. The apertures on the reverse side of the sensors as for example apertures 87 may be filled with a conductive epoxy or any other means to affix the sensors to the interconnecting layer. The sensors have bosses on the front surface. The height of the boss, as indicated, is slightly elevated with respect to the external surfaces of the sensor. Thus when a hand is placed on a plate it will touch and depress the bosses of the various sensors to provide an output which is representative of all the sensors that are contacted. One must be aware that there are many alternative embodiments which can be accommodated by the present invention and all are deemed to be incorporated within the spirit and scope of the present invention.

Figure 11:
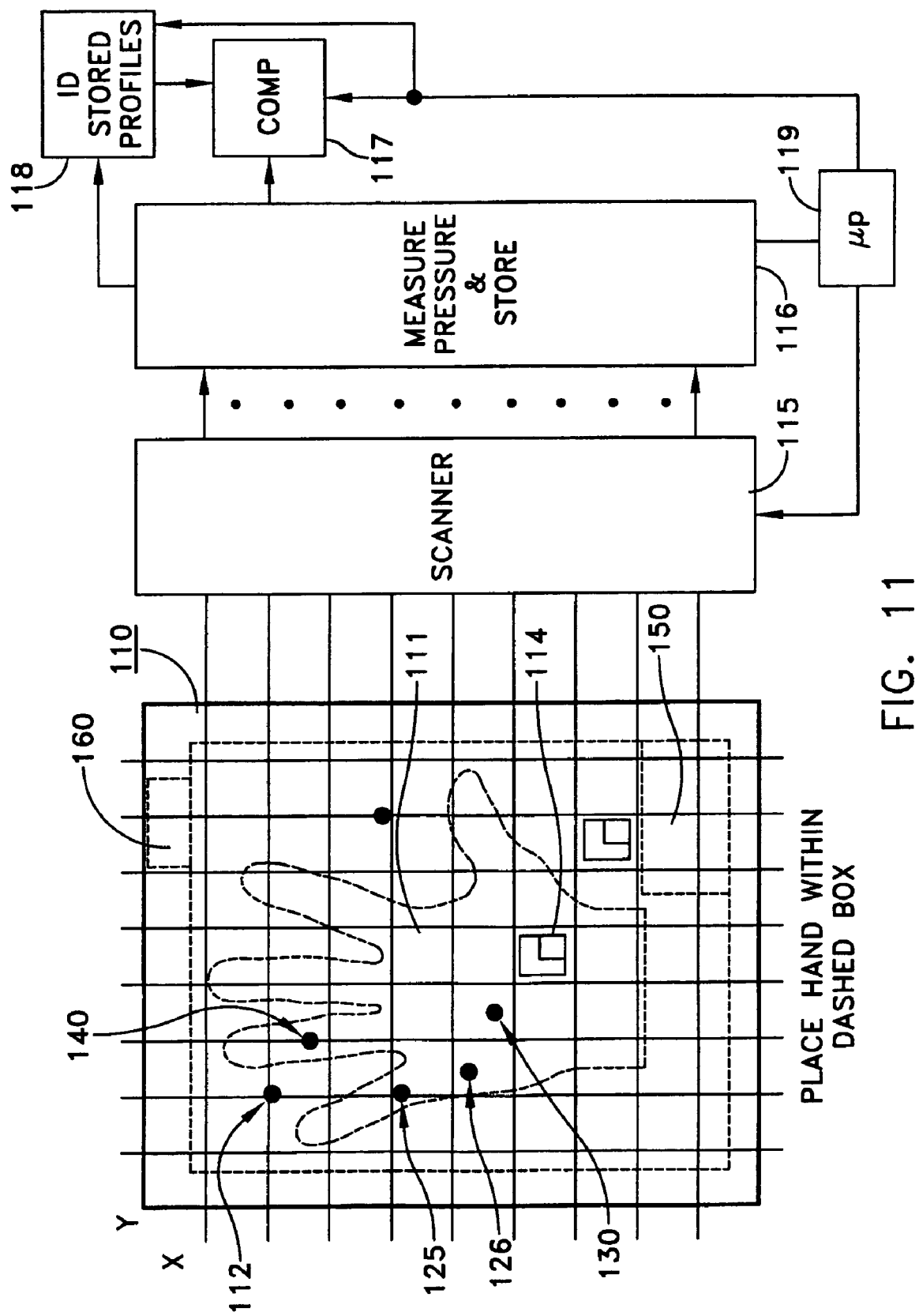
FIG. 11 is a schematic diagram depicting an alternate embodiment of the personal identification apparatus according to this invention.

FIG. 11 is a schematic diagram depicting an alternate embodiment of the personal identification apparatus according to this invention. In the above description a replication matrix indicative of a hand template employed a plurality of pressure sensors distributed and located within the area of the template 11. While this approach has advantages, it is also contemplated that the invention can operate without providing a hand template. In FIG. 11 there is shown a plate 110 which has pressure sensors positioned throughout the plate as for example sensors 112, 125, 126, 130, 140 and so on. The sensors are arranged in an X-Y matrix. Thus each sensor is defined by a row position X and a column position Y. This matrix addressing is well known. When a person to be identified places his hand 111 on the plate or pressure sensor matrix 110, pressure is exerted in the areas his hand covers. In other areas as 150 and 160 the pressure is zero. Thus by scanning the sensor array one will obtain the outline of the person's hand as one can determine all zero pressure areas. While certain sensors within the hand area will also read zero a large number of sensors within the hand area will record a pressure. Thus the hand outline is electronically provided. In this manner areas of concern can be determined within the hand area, for example, areas A, B, C and D of FIG. 4. Thus the array 110 is scanned (X,Y) by scanner 115. This provides pressure signals to pressure measurement device 116. The device 116 receives the signals which are voltage levels from each sensor in the array and stores scanned signals in a X-Y memory matrix which may be a ROM or other memory. The stored pressure profiles 116 are compared with the ID stored profiles were obtained during enrollment. A comparison is made via comparator 117. Based on known algorithms if there is a favorable comparison of pressure points, the person whose ID was presented is positively identified and gains access to the secured region or premises. It is understood that the processes described above are all under control of a microprocessor 119. The microprocessor 119 can perform scanning, storage and comparison. It is, of course, understood that the hand template could be employed and therefore depicted on plate 110 while using the scanner to scan the array without the necessity of first determining the hand outline. Also shown is a temperature sensor 114. The temperature sensor is employed to confirm the positioning of a human hand rather than a replica of a hand. Temperature sensors 114 can be randomly distributed within the hand template to confirm the presence of a human hand. This temperature measurement can also be used with the individual in conjunction with the pressure reading.

Those of ordinary skill in the art may recognize that many modifications and variations of the present invention may be implemented without departing from the spirit or scope of the invention.

What is claimed is:

1. A personal identification apparatus for measuring tactile pressures exerted by a person's hand and indicative of his identity, comprising:

a pressure plate having a template of a human hand including a palm area and a plurality of elongated finger areas;

a plurality of pressure sensors distributed on said plate and within said template such that more of said pressure sensors are positioned near a periphery of the palm area than near a center of the palm area, wherein each of the pressure sensors is operative to provide an output signal proportional to a pressure applied to said plate at the area at which said sensor is located, to enable said sensors to provide said output when a person's hand is emplaced on said plate to exert a pressure on said plate, storage means for storing pressure profile signals of enrolled persons requiring identification, and means for comparing said stored pressure profile with said output pressure signals to provide a favorable comparison when said output signals conform to said stored profile signals for positively identifying said person.

2. The personal identification apparatus according to claim 1 wherein said sensors are arranged in an X-Y matrix.

3. The personal identification apparatus according to claim 2 further including: a scanner coupled to said X-Y matrix and operative to scan said matrix by rows and columns to provide scanned output signals.

4. The personal identification apparatus according to claim 3 wherein said scanned output signals are stored in a memory.

5. The personal identification apparatus according to claim 1 wherein each said sensor employs piezoresistive elements arranged in a Wheatstone Bridge configuration.

6. The personal identification apparatus according to claim 1 further including a microprocessor operative to control said storage means and said means for comparing to enable pressure points to be compared under microprocessor control.

7. The personal identification apparatus according to claim 1 further including temperature sensing means located on said plate and operative to measure the temperature of a human hand emplaced on said plate.

8. A personal identification apparatus for measuring tactile pressures indicative of a person's identity, comprising:

a replication matrix indicative of a template of a hand and capable of accommodating typical variations of people's hand size, wherein the template includes a palm area and a plurality of elongated finger areas, a plurality of pressure sensors distributed within said matrix, each providing an output signal when a person's hand is emplaced to exert pressure on said matrix, wherein more of said pressure sensors are positioned near a periphery of the palm area than near a center of the palm area;

storage means for storing pressure profile signals of enrolled persons having access to said personal identification apparatus, and means for comparing said provided output signals with said stored profile signal indicative of a person to be identified to provide a favorable comparison when said output signals conform to said stored profile signals for positively identifying said person.

9. The personal identification apparatus according to claim 8 wherein said pressure sensors are arranged in a X-Y matrix array.

10. The personal identification apparatus according to claim 8 wherein said sensors are piezoresistive elements positioned on a silicon substrate and arranged in a Wheatstone bridge configuration.

11. The personal identification apparatus according to claim 10 wherein each sensor has a central boss which extends above the sensor substrate surface and which boss receives the applied exerted pressure to direct the same to said piezoresistors.

12. A method of performing personal identification of a user who requires identification to be authorized, comprising the steps of:

providing a matrix of pressure sensors on a plate to which said user's hand can be emplaced, wherein the plate includes a template indicative of a human hand having a palm area and a plurality of elongated finger areas, and wherein a greater number of said sensors are positioned near a periphery of the palm area than near a center of the palm area, first emplacing said user's hand on said plate to cause selective pressure sensors responsive to the pressure applied by said hand to provide profile output signals, and storing said output signals in a memory to obtain a hand pressure profile for said user.

13. The method according to claim 12 further comprising the steps of:

second emplacing said user's hand on said plate to cause said pressure sensors to provide output signals according to applied pressure, and comparing said output signals with said stored signals to provide a favorable comparison when said signals correlate indicative of said user's identity to enable said user to be authorized.

14. The method according to claim 12 further comprising the step of:

scanning said matrix by row and column according to an X-Y address for each pressure sensor and to store said sensor output according to said X-Y address.

15. The method according to claim 12 further comprising the step of:

employing a microprocessor to control the storing of said output signals.

* * * * *